United States Patent
Zhong

(10) Patent No.: US 10,414,423 B2
(45) Date of Patent: Sep. 17, 2019

(54) STROLLER

(71) Applicant: Wonderland Switzerland AG, Steinhausen (CH)

(72) Inventor: Zhi-Ren Zhong, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/009,194

(22) Filed: Jun. 14, 2018

(65) Prior Publication Data

US 2018/0362066 A1 Dec. 20, 2018

(30) Foreign Application Priority Data

Jun. 15, 2017 (CN) .......................... 2017 1 0453034

(51) Int. Cl.
*B62B 7/08* (2006.01)
*B62B 7/06* (2006.01)
*B62B 7/14* (2006.01)

(52) U.S. Cl.
CPC ............... *B62B 7/062* (2013.01); *B62B 7/064* (2013.01); *B62B 7/08* (2013.01); *B62B 7/142* (2013.01); *B62B 7/145* (2013.01); *B62B 2205/23* (2013.01); *B62B 2205/24* (2013.01)

(58) Field of Classification Search
CPC ............ B62B 3/007; B62B 5/08; B62B 5/082
See application file for complete search history.

(56) References Cited

U.S. PATENT DOCUMENTS

| | | | | |
|---|---|---|---|---|
| 6,102,431 | A * | 8/2000 | Sutherland | B62B 7/062 |
| | | | | 280/47.17 |
| 9,701,333 | B2 * | 7/2017 | Liu | B62B 7/08 |
| 2002/0121766 | A1 * | 9/2002 | Suzuki | B62B 7/08 |
| | | | | 280/647 |
| 2016/0144879 | A1 * | 5/2016 | Storm | B62B 7/083 |
| | | | | 280/650 |

FOREIGN PATENT DOCUMENTS

| | | |
|---|---|---|
| CN | 202213609 U | 5/2012 |
| CN | 205273580 U | 6/2016 |
| GB | 2503085 A | 12/2013 |
| GB | 2511603 A | 9/2014 |

* cited by examiner

*Primary Examiner* — James A Shriver, II
*Assistant Examiner* — James J Triggs
(74) *Attorney, Agent, or Firm* — Winston Hsu

(57) ABSTRACT

A stroller includes a frame, a first locking mechanism, a folding mechanism and a second locking mechanism. The frame is configured to be folded and unfolded between a folded state and an unfolded state. The first locking mechanism is disposed on the frame and for locking the unfolded frame and restraining the frame from being folded when the frame is in the unfolded state. The folding mechanism is movably disposed on the frame and connected to the first locking mechanism for driving the first locking mechanism to allow the frame to be folded. The second locking mechanism is disposed on the folding mechanism and separably abuts against the frame for restraining the folding mechanism from driving the first locking mechanism so as to lock the unfolded frame.

15 Claims, 10 Drawing Sheets

STROLLER

BACKGROUND OF THE INVENTION

1. Field of the Invention

The present invention relates to an infant carrier, and more particularly, to a stroller with a safe locking mechanism and easy folding operation.

2. Description of the Prior Art

Infant carriers are widely used in families with infants or children. Taking a stroller as an example, the stroller brings convenience in outdoor activities for caregivers. The stroller is usually configured to be foldable, so that the stroller can be folded for easy storage and easy transportation when the stroller is not in use.

Furthermore, the stroller is usually also provided with a locking mechanism for locking the stroller in a using state, which prevents damage of a child due to unintentionally folding operation of the stroller. However, the conventional stroller merely includes the locking mechanism without any safety lock. Once the locking mechanism fails, it brings a potential risk of the damage of the child. Furthermore, currently, it is still not easy enough for the caregivers to fold the stroller.

Therefore, there is a need to provide a stroller with a safe locking mechanism, easy folding operation and a reduced folded volume for solving the aforementioned problems.

SUMMARY OF THE INVENTION

It is an objective of the present invention to provide a stroller with a safe locking mechanism, easy folding operation, and reduced folded volume.

In order to achieve the aforementioned objective, the present invention discloses a stroller including a frame, at least one first locking mechanism, a folding mechanism and a second locking mechanism. The frame is configured to be folded and unfolded between a folded state and an unfolded state. The at least one first locking mechanism is disposed on the frame and for locking the unfolded frame and restraining the frame from being folded when the frame is in the unfolded state. The folding mechanism is movably disposed on the frame and connected to the at least one first locking mechanism for driving the at least one first locking mechanism to allow the frame to be folded. The second locking mechanism is disposed on the folding mechanism and separably abuts against the frame for restraining the folding mechanism from driving the at least one first locking mechanism so as to lock the unfolded frame.

Preferably, the at least one first locking mechanism is switchable between a locking state and a releasing state, and the folding mechanism is operated to drive the at least one first locking mechanism to switch from the locking state to the releasing state.

Preferably, the second locking mechanism is moveable between a locking position and a releasing position. The second locking mechanism abuts against the frame when the second locking mechanism is located at the locking position, and the folding mechanism is allowed to drive the at least one first locking mechanism to move when the second locking mechanism disengages from the frame to be located at the releasing position.

Preferably, the frame includes a handle, at least one front leg, at least one rear leg and a tube. The at least one front leg and the at least one rear leg are pivoted to the handle. The tube is pivoted to the at least one front leg and the at least one rear leg. The at least one first locking mechanism is disposed between the handle and the at least one front leg. The folding mechanism is movably connected to the at least one front leg, and the second locking mechanism separably abuts against the tube.

Preferably, the frame further includes a first pivoting joint and a second pivoting joint. The first pivoting joint is fixed on the at least one front leg. The second pivoting joint is fixed on the handle, and the at least one first locking mechanism is disposed between the first pivoting joint and the second pivoting joint.

Preferably, the at least one first locking mechanism includes an engaging component, a connecting component and a recovering component. The engaging component is slidably disposed inside the at least one front leg and movable between a first position and a second position. The engaging component engages with the handle when the engaging component is located at the first position. The connecting component is slidably connected to the at least one front leg and connected to the engaging component and the folding mechanism. The folding mechanism drives the engaging component to slide by the connecting component. The recovering component is disposed inside the at least one front leg and abuts against the engaging component. The recovering component biases the engaging component to move from the second position to the first position.

Preferably, an engaging notch is formed on the handle for cooperating with the engaging component.

Preferably, a slot is formed on the engaging component for allowing the connecting component to pass therethrough.

Preferably, the at least one first locking mechanism further includes a pin component. The pin component is fixed on the at least one front leg and passes through the engaging component, and the recovering component abuts between the pin component and the engaging component.

Preferably, the folding mechanism includes a folding bar and a sliding sleeve fixed on the folding bar, and the sliding sleeve is slidably connected to the at least one front leg and connected to the at least one first locking mechanism.

Preferably, the second locking mechanism includes a safety lock pivoted to the folding mechanism and a resilient component disposed on the safety lock, and the resilient component biases the safety lock to abut against the tube.

Preferably, the safety lock includes an abutting end, and a recess is formed on the abutting end for cooperating with the tube.

Preferably, the stroller further includes a seat detachably connected to the frame, and the seat is foldable along with the frame.

In contrast to the prior art, the stroller of the present invention utilizes the first locking mechanism disposed on the frame to lock the unfolded frame, so as to restrain the unfolded frame from being folded. Furthermore, the stroller of the present invention further utilizes the folding mechanism movably disposed on the frame and connected to the first locking mechanism to drive the first locking mechanism to release the unfolded frame, so as to allow the unfolded frame to be folded. Besides, the stroller of the present invention further utilizes the second locking mechanism disposed on the folding mechanism and separably abutting against the frame to restrain the folding mechanism from moving, so as to restrain the unfolded frame from be folded. Therefore, the stroller of the present invention has an enhanced operational safety. When it is desired to fold the stroller, it only has to disengage the second locking mechanism from the frame, so that folding mechanism is allowed to be pulled downwardly to drive the first locking mechanism to allow the stroller to be folded. Therefore, the stroller of the present invention has easy folding operation and a reduced folded volume.

In order to achieve the aforementioned objective, the present invention further discloses a stroller including a frame, at least one first locking mechanism and a folding mechanism. The frame is configured to be folded and unfolded between a folded state and an unfolded state, and the frame includes a handle, at least one front leg, at least one rear leg and a tube. The at least one first locking mechanism is disposed between the handle and the at least one front leg and for locking the unfolded frame and restraining the frame from being folded when the frame is in the unfolded state. The folding mechanism is movably connected to the at least one front leg and connected to the at least one first locking mechanism for driving the at least one first locking mechanism to allow the frame to be folded.

Preferably, the frame further includes a first pivoting joint and a second pivoting joint. The first pivoting joint is fixed on the at least one front leg. The second pivoting joint is fixed on the handle, and the at least one first locking mechanism is disposed between the first pivoting joint and the second pivoting joint.

Preferably, the at least one first locking mechanism includes an engaging component, a connecting component and a recovering component. The engaging component is slidably disposed inside the at least one front leg and movable between a first position and a second position. The engaging component engages with the handle when the engaging component is located at the first position. The connecting component is slidably connected to the at least one front leg and connected to the engaging component and the folding mechanism. The folding mechanism drives the engaging component to slide by the connecting component. The recovering component is disposed inside the at least one front leg and abuts against the engaging component. The recovering component biases the engaging component to move from the second position to the first position.

In contrast to the prior art, the stroller of the present invention utilizes the first locking mechanism disposed between the handle and the front leg to lock the unfolded frame, so as to restrain the unfolded frame from being folded. Furthermore, the stroller of the present invention further utilizes the folding mechanism movably disposed on the front leg and connected to the first locking mechanism to drive the first locking mechanism to release the unfolded frame, so as to allow the unfolded frame to be folded. When it is desired to fold the stroller, it only has to pull folding mechanism downwardly to drive the first locking mechanism to allow the stroller to be folded. Therefore, the stroller of the present invention has easy folding operation and a reduced folded volume.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
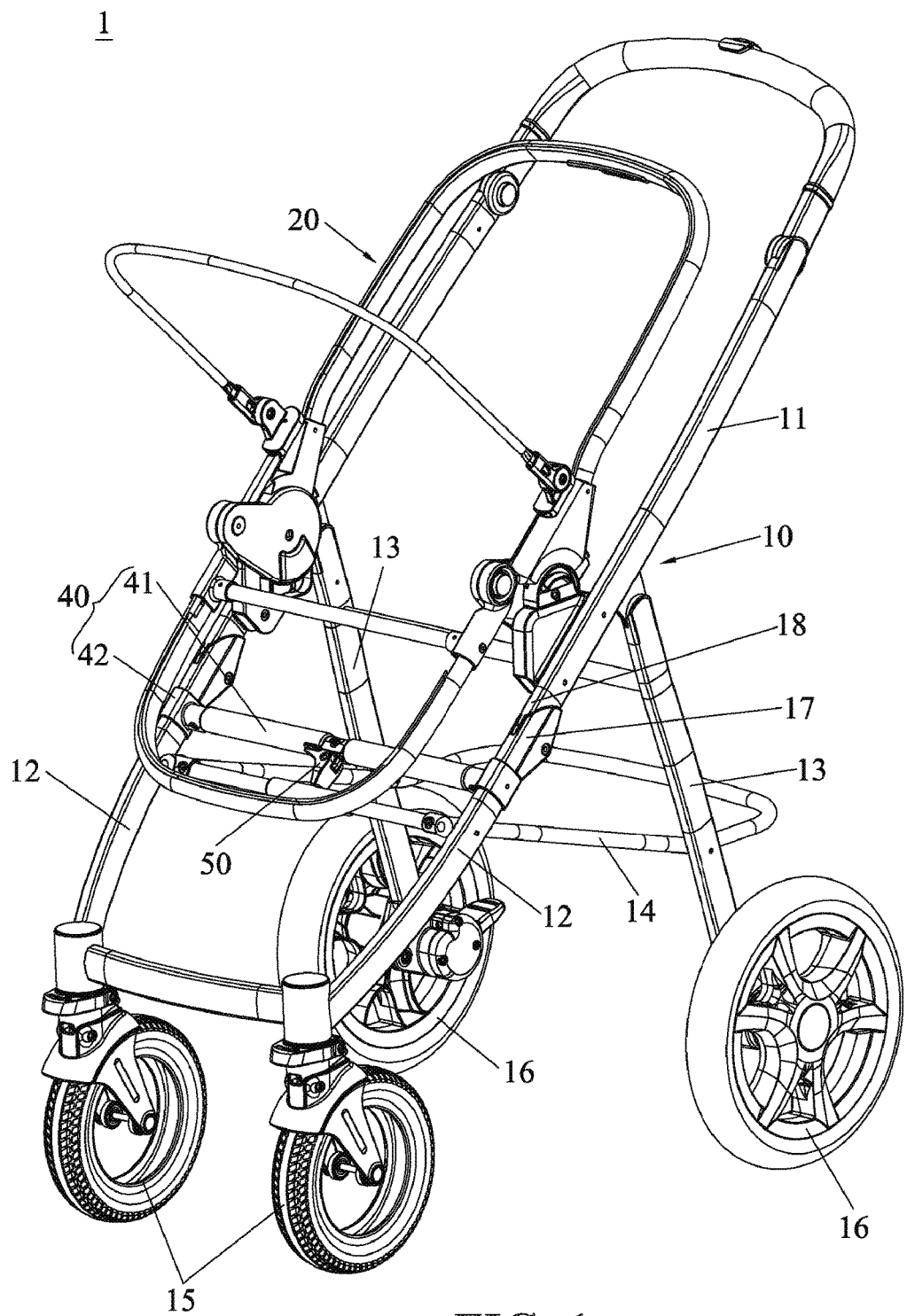
FIG. 1 is a schematic diagram of a stroller according to an embodiment of the present invention.
Figure 2:
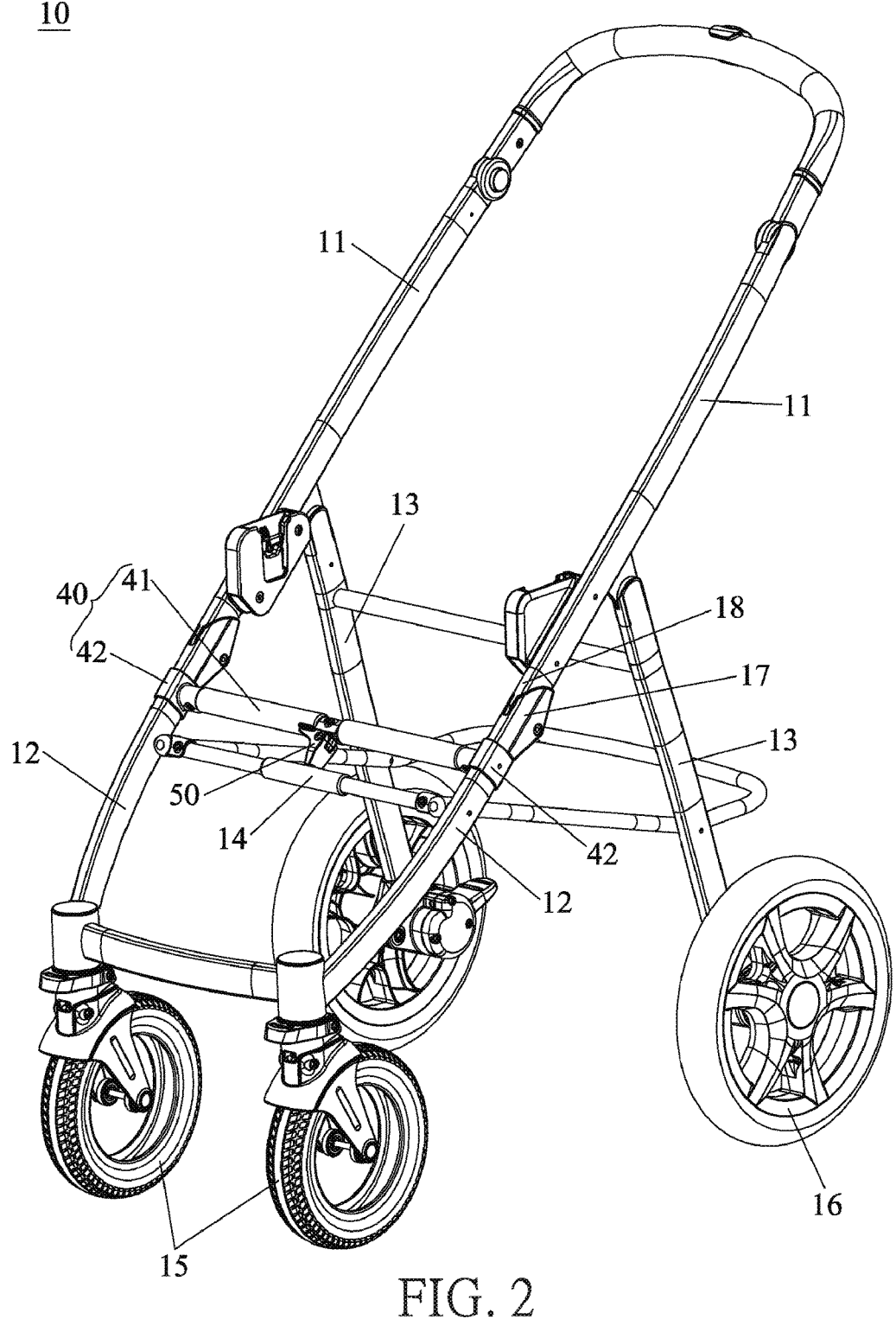
FIG. 2 is a diagram of a frame according to the embodiment of the present invention.
Figure 3:
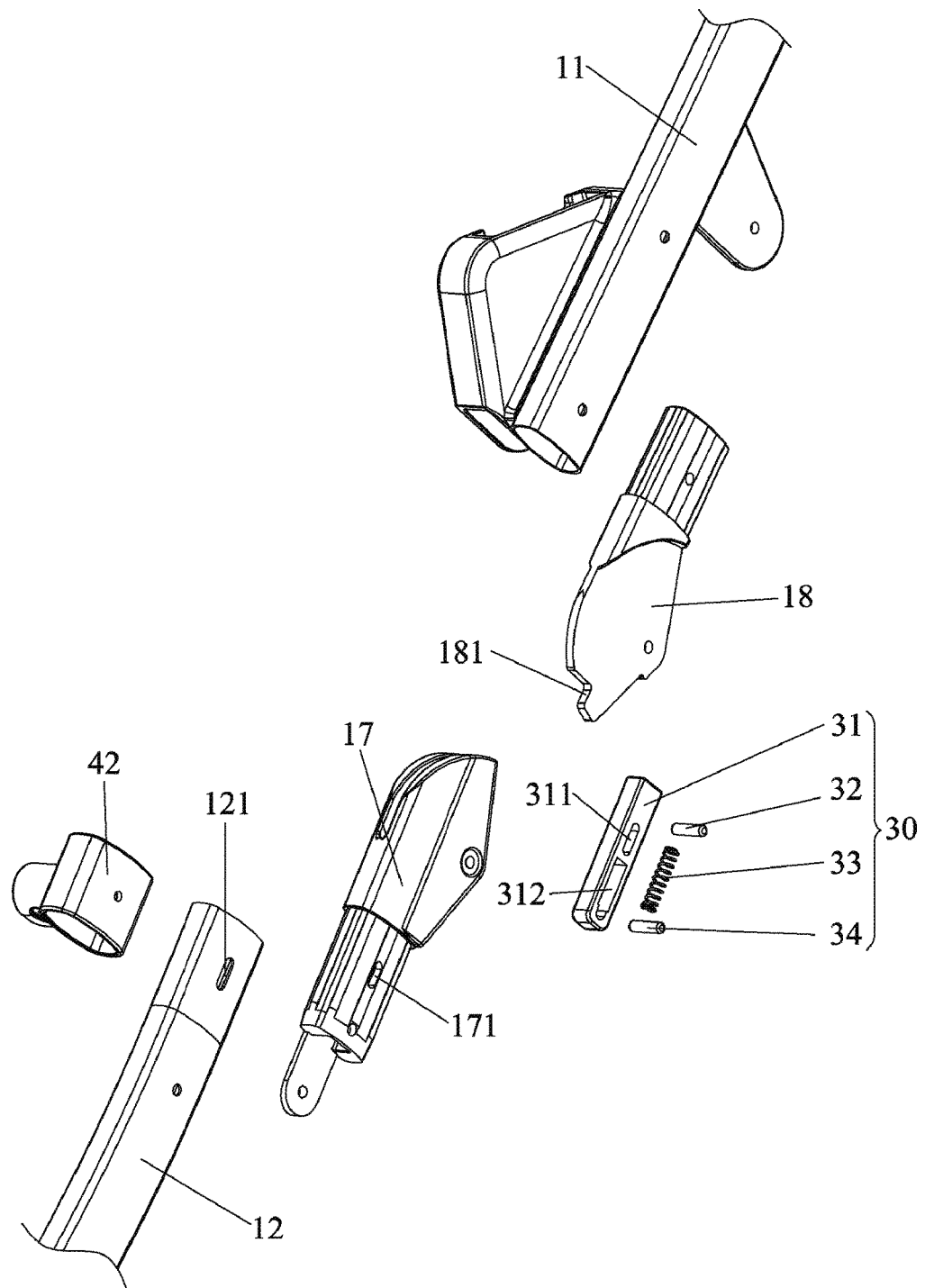
FIG. 3 is an exploded diagram of a first locking mechanism according to the embodiment of the present invention.
Figure 4:
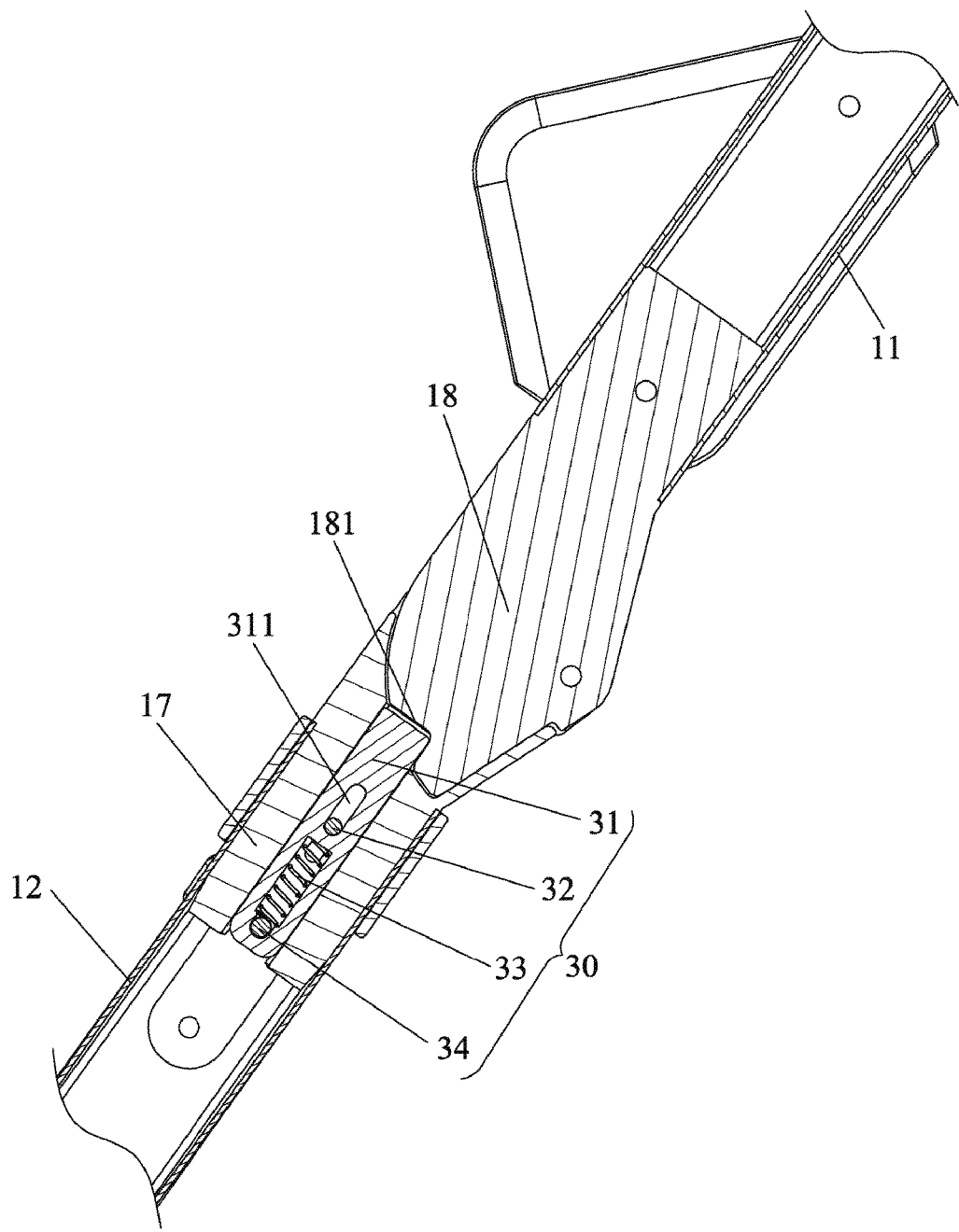
FIG. 4 is a sectional diagram of the first locking mechanism according to the embodiment of the present invention.

Please refer to FIG. 1 to FIG. 4. FIG. 1 is a schematic diagram of a stroller 1 according to an embodiment of the present invention. FIG. 2 is a diagram of a frame 10 according to the embodiment of the present invention. FIG. 3 is an exploded diagram of a first locking mechanism 30 according to the embodiment of the present invention. FIG. 4 is a sectional diagram of the first locking mechanism 30 according to the embodiment of the present invention. As shown in FIG. 1 to FIG. 4, the stroller 1 includes the frame 10, a seat 20, two first locking mechanisms 30 and a folding mechanism 40. The frame 10 can be folded and unfolded between a folded state and an unfolded state. The seat 20 is detachably connected to the frame 10 and foldable along with the frame 10. The two first locking mechanisms 30 are disposed on the frame 10 and for locking the unfolded frame 10 and restraining the unfolded frame 10 from being folded. The folding mechanism 40 is movably disposed on the frame 10 and connected to the two first locking mechanisms 30 for driving the two first locking mechanisms 30 to release the unfolded frame 10, so as to allow the unfolded frame 10 to be folded. Therefore, it is easy and convenient to fold the stroller 1 of the present invention.

As shown in FIG. 1 and FIG. 2, the frame 10 includes a handle 11, two front legs 12, two rear legs 13, a tube 14, two front wheels 15 and two rear wheels 16. An upper end of each front leg 12 is pivoted to the handle 11 in an engageable manner. Each front wheel 15 is disposed on a lower end of the corresponding front leg 12. An upper end of each rear leg 13 is pivoted to a lower end of the handle 11. Each rear wheel 16 is disposed on a lower end of the corresponding rear leg 13. Two front ends of the tube 14 are pivoted to the two front legs 12, respectively. Two rear ends of the tube 14 are pivoted to the two rear legs 13, respectively.

As shown in FIG. 2 to FIG. 4, each first locking mechanism 30 is disposed between the handle 11 and the corresponding front leg 12. The folding mechanism 40 is movably connected to the two front legs 12 and located above the tube 14. The folding mechanism 40 can be pulled downwardly to drive the two first locking mechanisms 30 to release the unfolded frame 10, so as to allow the unfolded frame 10 to be folded.

Furthermore, the frame 10 further includes two first pivoting joints 17 and two second pivoting joints 18. Each first pivoting joint 17 is fixed on the upper end of the corresponding front leg 12. Each second pivoting joint 18 is fixed on the lower end of the handle 11. Each first locking mechanism 30 is disposed inside the corresponding first pivoting joint 17 for separably abutting against the corresponding second pivoting joint 18, so that the handle 11 and the corresponding front leg 12 are pivoted to each other in the engageable manner.

As shown in FIG. 2 to FIG. 4, each first locking mechanism 30 can be switched between a locking state and a releasing state. Each first locking mechanism 30 abuts against the corresponding second pivoting joint 18 when each first locking mechanism 30 is in the locking state. When the folding mechanism 40 is pulled downwardly, the folding mechanism 40 can drive the two first locking mechanisms 30 to disengage from the two second pivoting joints 18, so as to switch the two first locking mechanisms 30 from the locking state to the releasing state. At this moment, the handle 11 is allowed to pivot relative to the two front legs 12, so as to fold the frame 10.

As shown in FIG. 3 and FIG. 4, each first locking mechanism 30 includes an engaging component 31, a connecting component 32 and a recovering component 33. The engaging component 31 is slidably disposed inside the corresponding first pivoting joint 17 and movable between a first position and a second position. The engaging component 31 engages with the corresponding second pivoting joint 18 when the engaging component 31 is located at the first position. The engaging component 31 disengages from the corresponding second pivoting joint 18 when the engaging component 31 is located at the second position. The connecting component 32 is slidably connected to the corresponding first pivoting joint 17 and connected to the corresponding engaging component 31 and the folding mechanism 40. The folding mechanism 40 slides to drive the two engaging components 31 to slide by the two connecting components 32. The recovering component 33 is disposed inside the corresponding first pivoting joint 17 and abuts against the corresponding engaging component 31 to bias the corresponding engaging component 31 to move from the second position to the first position.

Specifically, a first through hole 171 is formed on each first pivoting joint 17. A second through hole 121 is formed on each front leg 12. each first through hole 171 and each second through hole 121 can extend along a direction parallel to the corresponding front leg 12. The two second through holes 121 are located at positions corresponding to the two first through holes 171 when the two first pivoting joints 17 are fixed on the two front legs 12. Each connecting component 32 passes through the corresponding first through hole 171 and the corresponding second through hole 121 and is connected to the corresponding engaging component 31 and the folding mechanism 40. Furthermore, an engaging notch 181 is formed on each second pivoting joint 18 for cooperating with the corresponding engaging component 31, which secures engagement of the engaging components 31 and the second pivoting joints 18.

In the present invention, each first locking mechanism 30 further includes a pin component 34 fixed on the corresponding first pivoting joint 17 and slidably passing through the corresponding engaging component 31. Two ends of each recovering component 33 abut against the corresponding pin component 34 and the corresponding engaging component 31 respectively, as shown in FIG. 4. In such a way, the two engaging components 31 can compress the two recovering components 33 when the two engaging components 31 slide toward the second position. The two engaging components 31 can be driven to slide toward the first position when the two recovering components 33 are released to recover.

As shown in FIG. 3 and FIG. 4, a slot 311 and a sliding slot 312 are formed on each engaging component 31. Each connecting component 32 passes through the corresponding slot 311, the corresponding first through hole 171 and the corresponding second through hole 121, and each connecting component 32 is connected the folding mechanism 40. Each pin component 34 passes through the corresponding sliding slot 312 and is fixed on the corresponding first pivoting joint 17. Each recovering component 33 is received inside the corresponding sliding slot 312. The two ends of each recovering component 33 abut against the corresponding engaging component 31 and the corresponding pin component 34 to bias the corresponding engaging component 31 to move toward the first position.

Preferably, the recovering component 33 can be a compression spring. However, it is not limited thereto. In another embodiment, the recovering component 33 can be another resilient element.

Figure 5:
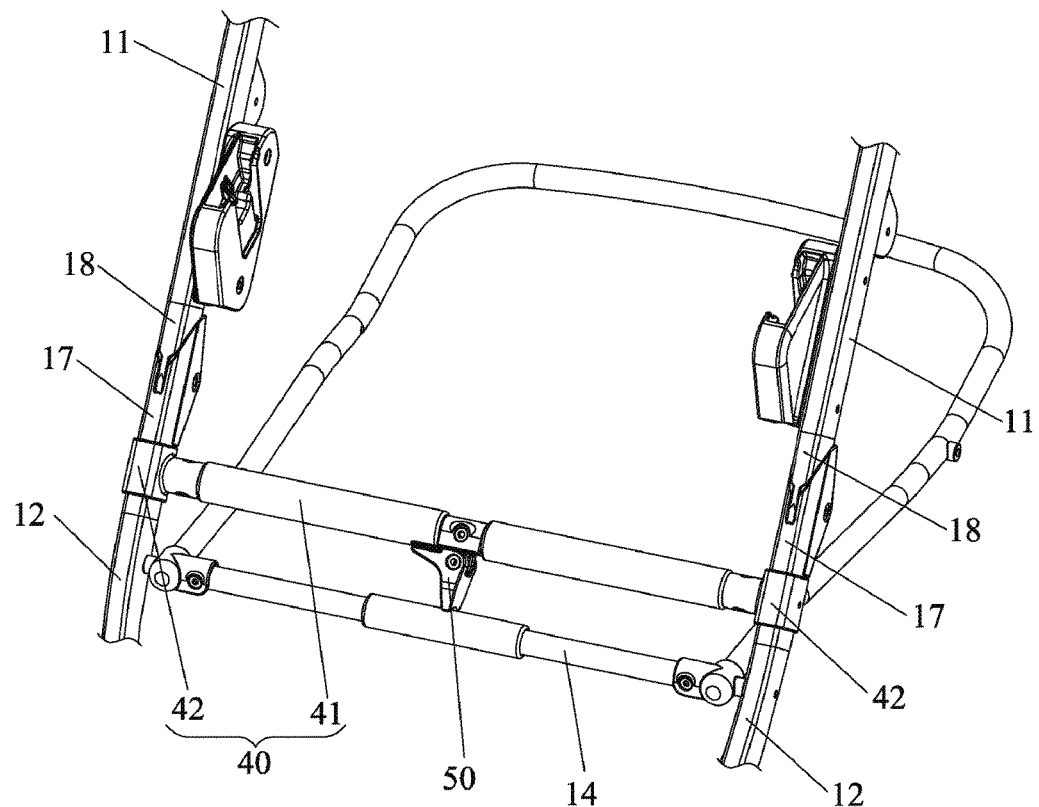
FIG. 5 is a partial enlarged diagram of the stroller as a second locking mechanism is located at a locking position according to the embodiment of the present invention.
Figure 6:
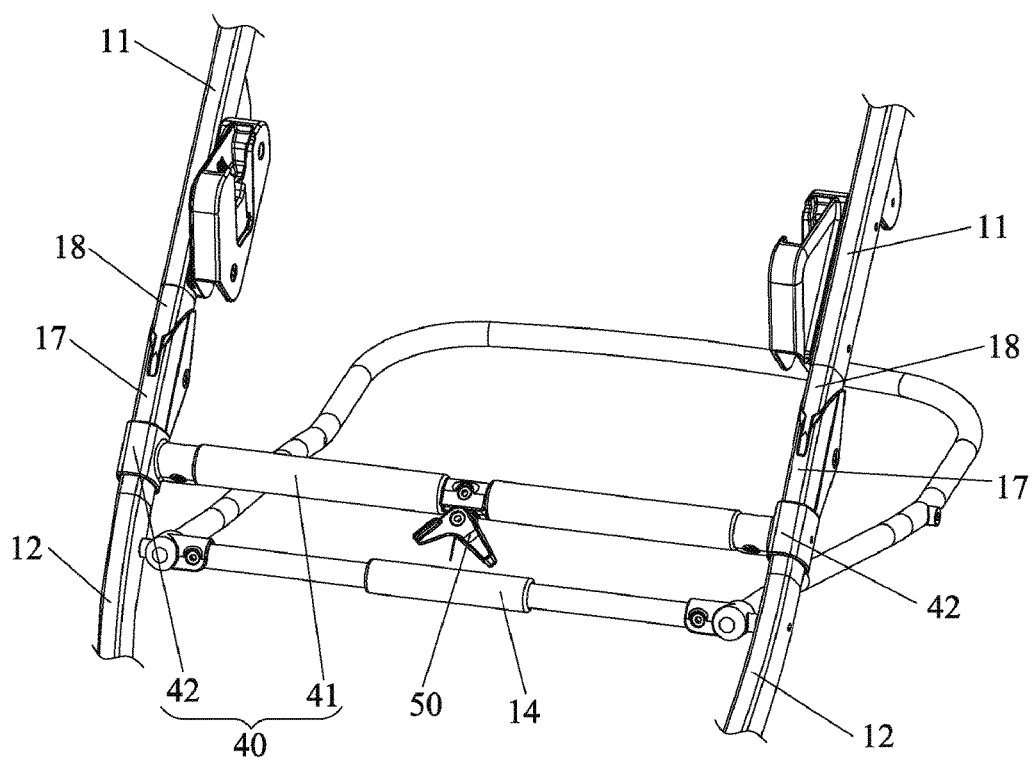
FIG. 6 is a partial enlarged diagram of the stroller as the second locking mechanism is located at a releasing position according to the embodiment of the present invention.
Figure 7:
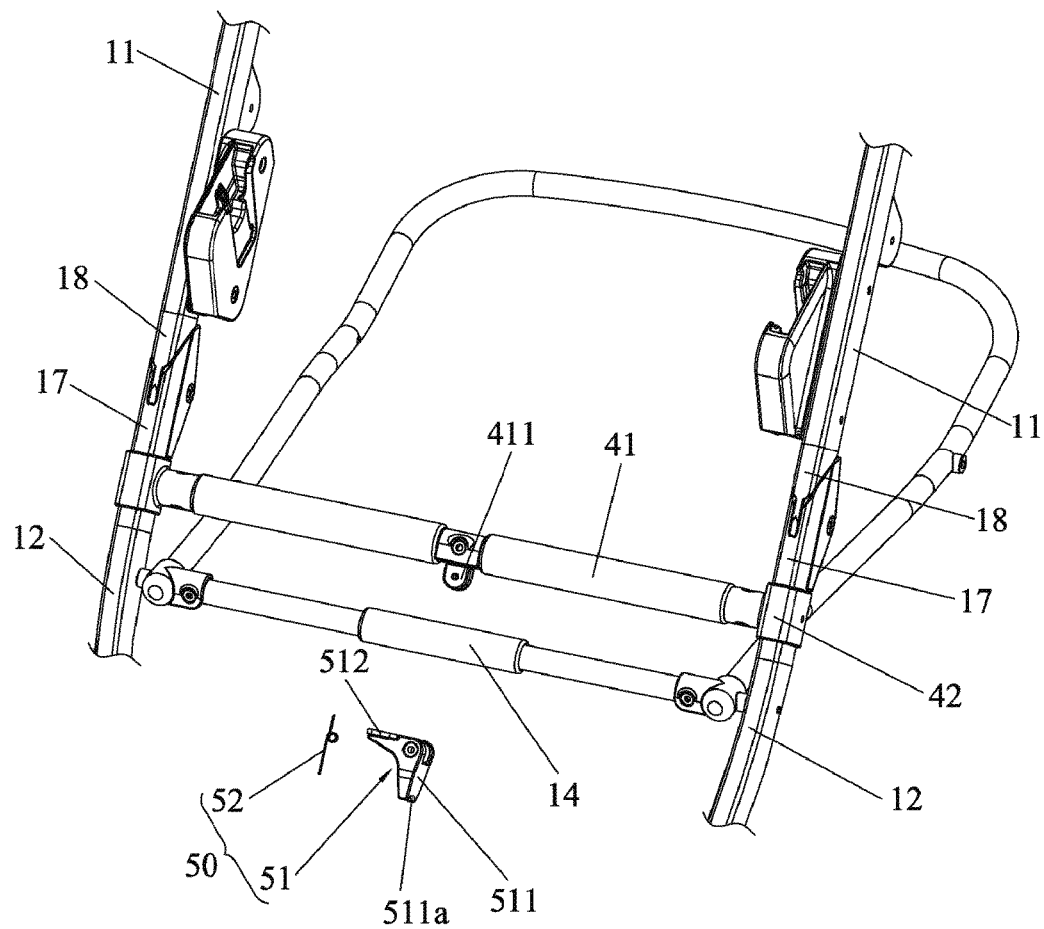
FIG. 7 is an exploded diagram of the second locking mechanism according to the embodiment of the present invention.

Please refer to FIG. 5 to FIG. 7. FIG. 5 is a partial enlarged diagram of the stroller 1 as a second locking mechanism 50 is located at a locking position according to the embodiment of the present invention. FIG. 6 is a partial enlarged diagram of the stroller 1 as the second locking mechanism 50 is located at a releasing position according to the embodiment of the present invention. FIG. 7 is an exploded diagram of the second locking mechanism 50 according to the embodiment of the present invention. As shown in FIG. 5 to FIG. 7, the folding mechanism 40 includes a folding bar 41 and two sliding sleeves 42 fixed on the folding bar 41. The two sliding sleeves 42 are slidably connected to the two front legs 12 and fixed with the two connecting components 32, respectively. Therefore, when the folding bar 41 is pulled downwardly, the folding bar 41 can drive the two connecting components 32 to slide by the two sliding sleeves 42, so that the two engaging components 31 can be driven to slide toward the second position by the two connecting components 32 to disengage from the two second pivoting joints 18.

Furthermore, as shown in FIG. 1 to FIG. 4 and FIG. 7, the stroller 1 further includes the second locking mechanism 50, and the folding bar 41 includes a pivoting plate 411, which is shown in FIG. 7. The second locking mechanism 50 is pivoted to the pivoting plate 411. Specifically, the second locking mechanism 50 is disposed on the pivoting plate 411 of the folding mechanism 40 and separably abuts against the frame 10 for locking the unfolded frame 10 and restraining the unfolded frame 10 from being folded. The folding mechanism 40 is allowed to switch the two first locking mechanisms 30 to the releasing state when the second locking mechanism 50 disengages from the frame 10. Therefore, such configuration of the two locking mechanisms makes the stroller 1 safer.

As shown in FIG. 5 and FIG. 6, the second locking mechanism 50 is rotatably connected to the folding bar 41 and is movable between a locking position and a releasing position. When the second locking mechanism 50 is located at the locking position, the second locking mechanism 50 abuts against the tube 14, so as to restrain the folding bar 41 from being pulled downwardly. The folding bar 41 is allowed to be pulled downwardly to switch the two first locking mechanisms 30 to the releasing state when the second locking mechanism 50 rotates to disengage from the tube 14 to the releasing position.

As shown in FIG. 7, the second locking mechanism 50 includes a safety lock 51 pivoted to the folding bar 41 and a resilient component 52 disposed on the safety lock 51. The resilient component 52 is installed on a pivoting shaft of the safety lock 51 for biasing the safety lock 51 to abut against the tube 14. The safety lock 51 includes a first abutting end 511 and a second abutting end 512. There is an included angle formed between the first abutting end 511 and the second abutting end 512. A connection of the first abutting end 511 and the second abutting end 512 is pivoted to the pivoting plate 411. A recess 511a is formed on an end of the first abutting end 511 for cooperating with the tube 14. The resilient component 52 is installed on the pivoting shaft of the safety lock 51. As shown in FIG. 5, when the second locking mechanism 50 is located at the locking position, the tube 14 engages with the recess 511a on the first abutting end 511 and abuts against an inner wall of the recess 511a, and a lateral portion of the second abutting end 512 abuts against the folding bar 41. Furthermore, the resilient component 52 biases the second locking mechanism 50 to be located at the locking position. As shown in FIG. 6, when the safety lock 51 is rotated to disengage the first abutting end 511 from the tube 14 and to disengage the second abutting end 512 from the folding bar 41, the second locking mechanism 51 is located at the releasing position, so that the folding bar 41 is allowed to be pulled downwardly to switch the two first locking mechanisms 30 to the releasing state.

Preferably, the resilient component 52 can be a torsional spring. However, it is not limited thereto. The resilient component 52 can be another resilient member.

Furthermore, as shown in FIG. 3 and FIG. 4, the slot 311 is formed on each engaging component 31. Each connecting component 32 passes through the corresponding slot 311, the corresponding first through hole 171 and the corresponding second through hole 121 and is fixedly connected to the corresponding sliding sleeve 42. Therefore, when the frame 10 is being unfolded, it can prevent the second locking mechanism 50 and the tube 14 from interfering with each other, which ensures smooth unfolding operation.

Figure 8:
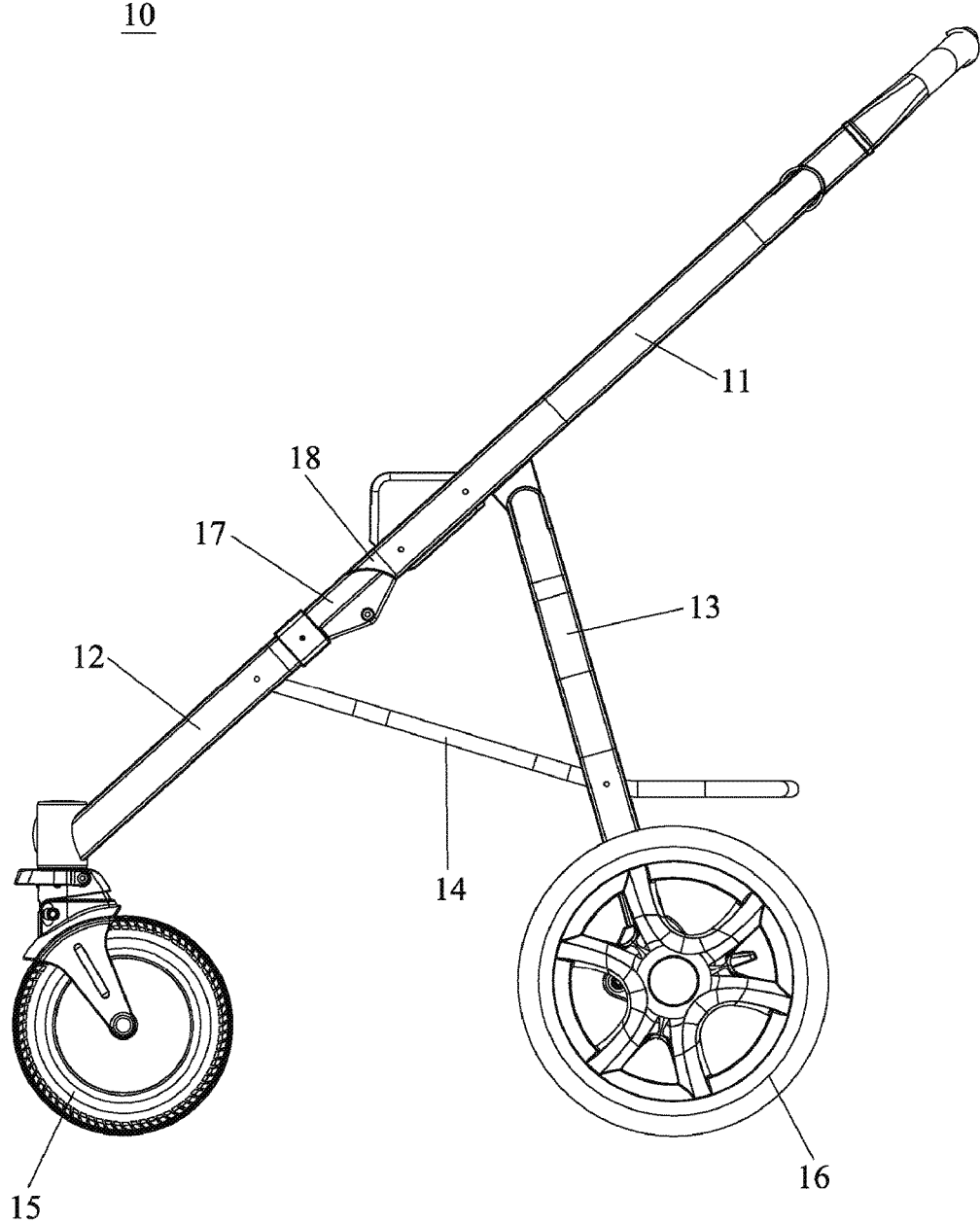
FIG. 8 is a lateral diagram of the frame in an unfolded state according to the embodiment of the present invention.
Figure 9:
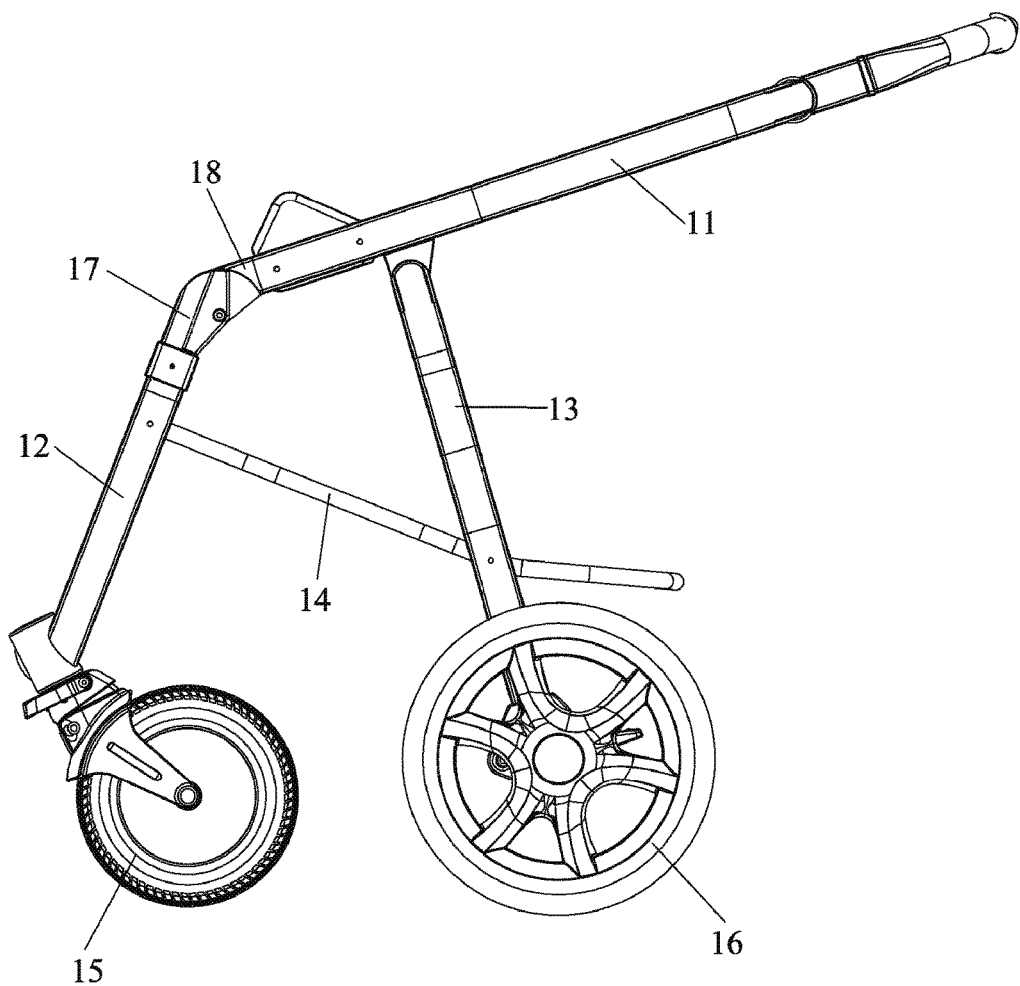
FIG. 9 is a lateral diagram of the frame in a state between the unfolded state and a folded state according to the embodiment of the present invention.
Figure 10:
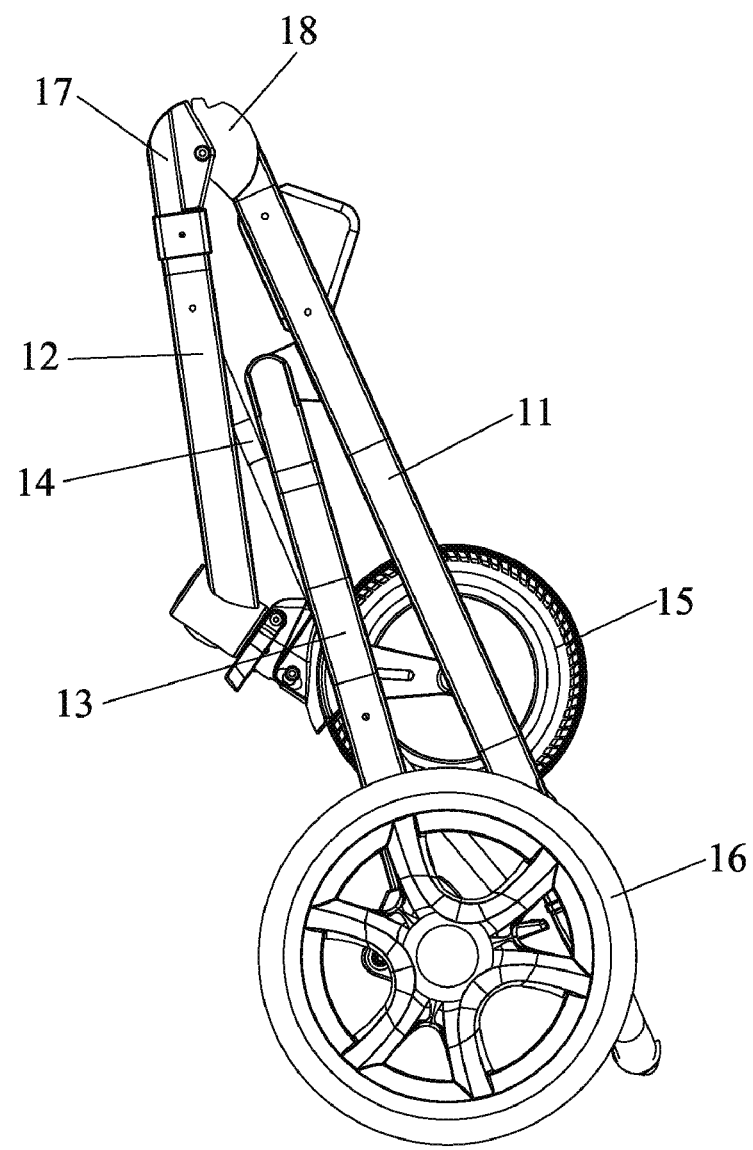
FIG. 10 is a lateral diagram of the frame in the folded state according to the embodiment of the present invention.

Please refer to FIG. 8 to FIG. 10. FIG. 8 is a lateral diagram of the frame 10 in the unfolded state according to the embodiment of the present invention. FIG. 9 is a lateral diagram of the frame 10 in a state between the unfolded state and the folded state according to the embodiment of the present invention. FIG. 10 is a lateral diagram of the frame 10 in the folded state according to the embodiment of the present invention. Operational principle of the stroller 1 of the present invention is described as follows.

As shown in FIG. 1, FIG. 2, FIG. 4 and FIG. 8, the two first locking mechanisms 30 and the second locking mechanism 50 can be operated to lock the unlocked frame 10 to restrain the frame 10 from being folded. Specifically, the two engaging components 31 of the two first locking mechanisms 30 can engage with the two engaging notches 181 on the two second pivoting joint 18, as shown in FIG. 4. The two engaging components 31 are biased to be located at the first position by the two recovering components 33. At this moment, the safety lock 51 of the second locking mechanism 50 can abut against the tube 14 to provide a secure function for the frame 10, so as to prevent the two first locking mechanisms 30 from switching to the releasing state. Therefore, the frame 10 can be locked and restrained in the unfolded state by the two first locking mechanisms 30 and the second locking mechanism 50 cooperatively, which makes the stroller 1 safer.

As shown in FIG. 6, when it is desired to fold the stroller 1, the second locking mechanism 50 can be operated to be located at the releasing position. That is, the safety lock 51 can be rotated to disengage the first abutting end 511 from the tube 14 and to disengage the second abutting end 512 from the folding bar 41. At this moment, the folding bar 41 is allowed to be pulled downwardly to drive the two sliding sleeves 42 to slide downwardly along the two front legs 12. The two sliding sleeves 42 drive the two engaging components 31 to slide toward the lower ends of the two front legs 12 by the two connecting components 32. During the aforementioned process, the two recovering components 33 are compressed. When the two engaging components 31 are driven to move to the second position to disengage from the two second pivoting joints 18, the two first locking mechanisms 30 are in the releasing state. At this moment, the handle 11 can be driven to pivot toward the two front legs 12 around a pivoting shaft of the handle 11 and the two front legs 12 downwardly by gravity when raising the stroller 1, as shown in FIG. 9. When the handle 11 is pivoting toward the two rear legs 13 downwardly, the two front legs 12 can be driven to pivot by the handle 11 toward the two rear legs 13, so that the frame 10 can be folded in the folded state, as shown in FIG. 10. Therefore, the frame 10 has a reduced folded volume and easy and smooth folding operation. Furthermore, during the aforementioned folding process, the seat 20 is foldable along with the frame 10. Description of operational principle of the seat 20 is omitted herein for simplicity.

When it is desired to unfold the stroller 1, it only has to push the handle 11 to pivot upwardly. The handle 11 drives the two front legs 12 to pivot frontward when the handle 11 pivots upwardly. When the handle 11 pivots from a position, as shown in FIG. 10, to a position, as shown in FIG. 8, the two engaging components 31 of the two first locking mechanisms 30 can be driven by the two resilient components 33 to engage with the two engaging notches 181 on the two second pivoting joints 18 again, which switches the two first locking mechanisms 30 to the locking state to restrain the frame 10 from being folded. Furthermore, during the aforementioned process, if the safety lock 51 interferes with the tube 14, the connecting component 32 can slide along the slot 311, so as to ensure smooth unfolding operation.

However, the stroller 1 of the present invention is not limited to the aforementioned embodiment. In another embodiment, the second locking mechanism 50 can be omitted.

In contrast to the prior art, the stroller of the present invention utilizes the first locking mechanism disposed on the frame to lock the unfolded frame, so as to restrain the unfolded frame from being folded. Furthermore, the stroller of the present invention further utilizes the folding mechanism movably disposed on the frame and connected to the first locking mechanism to drive the first locking mechanism to release the unfolded frame, so as to allow the unfolded frame to be folded. Besides, the stroller of the present invention further utilizes the second locking mechanism disposed on the folding mechanism and separably abutting against the frame to restrain the folding mechanism from moving, so as to restrain the unfolded frame from be folded. Therefore, the stroller of the present invention has an enhanced operational safety. When it is desired to fold the stroller, it only has to disengage the second locking mechanism from the frame, so that folding mechanism is allowed to be pulled downwardly to drive the first locking mechanism to allow the stroller to be folded. Therefore, the stroller of the present invention has easy folding operation and a reduced folded volume.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a frame configured to be folded and unfolded between a folded state and an unfolded state, the frame comprising a handle, at least one front leg, at least one rear leg and a tube, the at least one front leg and the at least one rear leg being pivoted to the handle, and the tube being pivoted to the at least one front leg and the at least one rear leg;
   at least one first locking mechanism disposed on the frame and for locking the unfolded frame and restraining the frame from being folded when the frame is in the unfolded state, and the at least one first locking mechanism being disposed between the handle and the at least one front leg;
   a folding mechanism movably disposed on the frame and connected to the at least one first locking mechanism for driving the at least one first locking mechanism to allow the frame to be folded, and the folding mechanism being movably connected to the at least one front leg; and
   a second locking mechanism disposed on the folding mechanism and separably abutting against the frame for restraining the folding mechanism from driving the at least one first locking mechanism so as to lock the unfolded frame, and the second locking mechanism separably abutting against the tube.

2. The stroller of claim 1, wherein the at least one first locking mechanism is switchable between a locking state and a releasing state, and the folding mechanism is operated to drive the at least one first locking mechanism to switch from the locking state to the releasing state.

3. The stroller of claim 1, wherein the second locking mechanism is moveable between a locking position and a releasing position, the second locking mechanism abuts against the frame when the second locking mechanism is located at the locking position, and the folding mechanism is allowed to drive the at least one first locking mechanism to move when the second locking mechanism disengages from the frame to be located at the releasing position.

4. The stroller of claim 1, wherein the frame further comprises a first pivoting joint and a second pivoting joint, the first pivoting joint is fixed on the at least one front leg, the second pivoting joint is fixed on the handle, and the at least one first locking mechanism is disposed between the first pivoting joint and the second pivoting joint.

5. The stroller of claim 1, wherein the at least one first locking mechanism comprises:
   an engaging component slidably disposed inside the at least one front leg and movable between a first position and a second position, the engaging component engaging with the handle when the engaging component is located at the first position;
   a connecting component slidably connected to the at least one front leg and connected to the engaging component and the folding mechanism, the folding mechanism driving the engaging component to slide by the connecting component; and
   a recovering component disposed inside the at least one front leg and abutting against the engaging component, the recovering component biasing the engaging component to move from the second position to the first position.

6. The stroller of claim 5, wherein an engaging notch is formed on the handle for cooperating with the engaging component.

7. The stroller of claim 5, wherein a slot is formed on the engaging component for allowing the connecting component to pass therethrough.

8. The stroller of claim 5, wherein the at least one first locking mechanism further comprises a pin component, the pin component is fixed on the at least one front leg and passes through the engaging component, and the recovering component abuts between the pin component and the engaging component.

9. The stroller of claim 1, wherein the folding mechanism comprises a folding bar and a sliding sleeve fixed on the folding bar, and the sliding sleeve is slidably connected to the at least one front leg and connected to the at least one first locking mechanism.

10. The stroller of claim 1, wherein the second locking mechanism comprises a safety lock pivoted to the folding mechanism and a resilient component disposed on the safety lock, and the resilient component biases the safety lock to abut against the tube.

11. The stroller of claim 10, wherein the safety lock comprises an abutting end, and a recess is formed on the abutting end for cooperating with the tube.

12. The stroller of claim 1, wherein the stroller further comprises a seat detachably connected to the frame, and the seat is foldable along with the frame.

13. A stroller comprising:
    a frame configured to be folded and unfolded between a folded state and an unfolded state, the frame comprising a handle, at least one front leg, at least one rear leg and a tube, the frame further comprising at least one first pivoting joint and at least one second pivoting joint, the at least one first pivoting joint being fixed on the at least one front leg, and the at least one second pivoting joint being fixed on the handle;
    at least one first locking mechanism disposed between the handle and the at least one front leg and for locking the unfolded frame and restraining the frame from being folded when the frame is in the unfolded state, and the at least one first locking mechanism being disposed between the at least one first pivoting joint and the at least one second pivoting joint; and
    a folding mechanism movably connected to the at least one front leg and connected to the at least one first locking mechanism for driving the at least one first locking mechanism to allow the frame to be folded.

14. The stroller of claim 13, wherein the at least one first locking mechanism comprises:
    an engaging component slidably disposed inside the at least one front leg and movable between a first position and a second position, the engaging component engaging with the handle when the engaging component is located at the first position;

a connecting component slidably connected to the at least one front leg and connected to the engaging component and the folding mechanism, the folding mechanism driving the engaging component to slide by the connecting component; and a recovering component disposed inside the at least one front leg and abutting against the engaging component, the recovering component biasing the engaging component to move from the second position to the first position.

15. A stroller comprising:

a frame configured to be folded and unfolded between a folded state and an unfolded state, and the frame comprising a handle, at least one front leg, at least one rear leg and a tube;

at least one first locking mechanism disposed between the handle and the at least one front leg and for locking the unfolded frame and restraining the frame from being folded when the frame is in the unfolded state, the at least one first locking mechanism comprising:

an engaging component slidably disposed inside the at least one front leg and movable between a first position and a second position, the engaging component engaging with the handle when the engaging component is located at the first position;

a connecting component slidably connected to the at least one front leg and connected to the engaging component and the folding mechanism, the folding mechanism driving the engaging component to slide by the connecting component; and a recovering component disposed inside the at least one front leg and abutting against the engaging component, the recovering component biasing the engaging component to move from the second position to the first position; and a folding mechanism movably connected to the at least one front leg and connected to the at least one first locking mechanism for driving the at least one first locking mechanism to allow the frame to be folded.

\* \* \* \* \*